United States Patent [19]

Pender

[11] E Re. 29,521

[45] Reissued Jan. 24, 1978

[54] LOCKING MEANS FOR BICYCLES AND THE LIKE

[76] Inventor: David R. Pender, 1018 Marion St., Columbia, S.C. 29201

[21] Appl. No.: 674,484

[22] Filed: Apr. 7, 1976

Related U.S. Patent Documents

Reissue of:

[64] Patent No.: 3,910,081
Issued: Oct. 7, 1975
Appl. No.: 467,792
Filed: May 7, 1974

[51] Int. Cl.[2] ..... B62H 5/00
[52] U.S. Cl. ..... 70/234
[58] Field of Search ..... 70/18, 49, 58, 93, 233, 70/234

[56] References Cited

U.S. PATENT DOCUMENTS

| | | | |
|---|---|---|---|
| 621,072 | 3/1899 | Gregory | 70/234 |
| 1,384,561 | 7/1921 | Hampton | 70/49 |
| 1,991,825 | 2/1935 | Strickland | 70/233 |
| 2,118,126 | 5/1938 | Wise | 70/234 |
| 3,765,197 | 10/1973 | Foote | 70/58 |
| 3,772,645 | 11/1973 | Odenz et al. | 70/234 |
| 3,802,232 | 4/1974 | Mattson et al. | 70/234 |

FOREIGN PATENT DOCUMENTS

| | | | |
|---|---|---|---|
| 866,462 | 5/1941 | France | 70/234 |

*Primary Examiner*—Richard E. Moore
*Attorney, Agent, or Firm*—B. P. Fishburne, Jr.

[57] ABSTRACT

[An anti-theft locking system for bicycles or other portable items utilizes a high strength hollow flexible tether which may be looped around the stationary object and plugged into a locking receiver or socket on the bicycle or, alternately, may be plugged directly into a locking opening provided in a hollow post such as a parking meter post. The tether has retractable spring-urged latches operated by an internal wire controlled by a key-locking mechanism fixed on the cycle or other portable article.]

*A locking means for a bicycle or the like consists of a locking unit permanently attached to a frame member of the bicycle. A flexible tether has an end permanently attached to the locking unit and has a plug-in lock element on its free end adapted to enter a receiver on the locking unit after being looped around an anchoring object.*

12 Claims, 8 Drawing Figures

FIG. 1
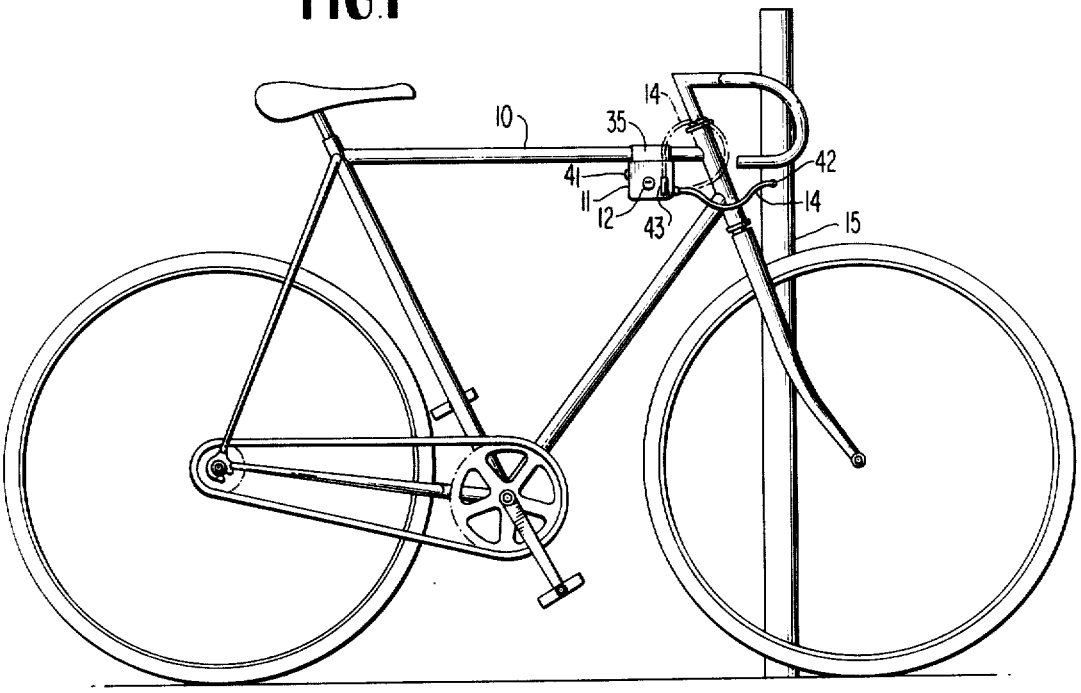
FIG. 2
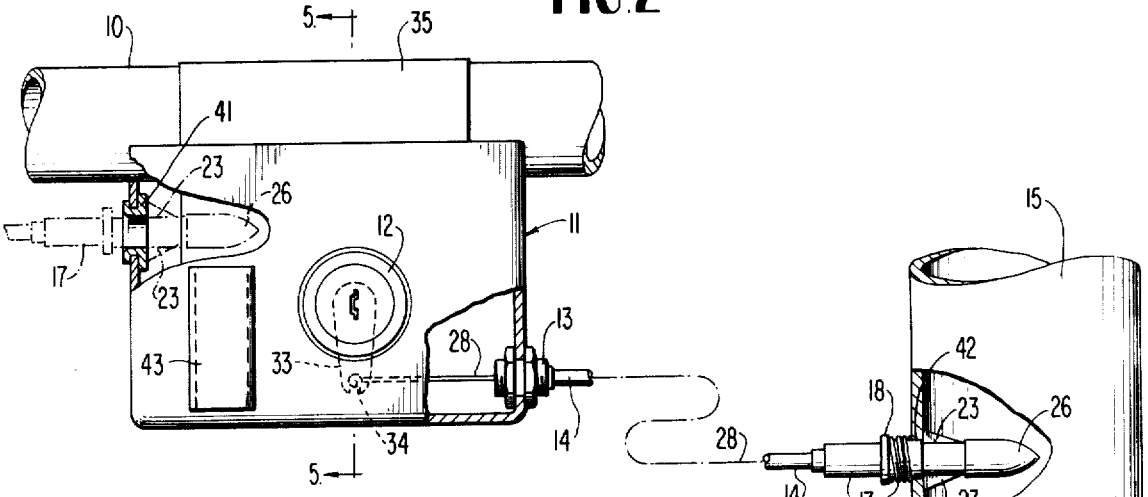
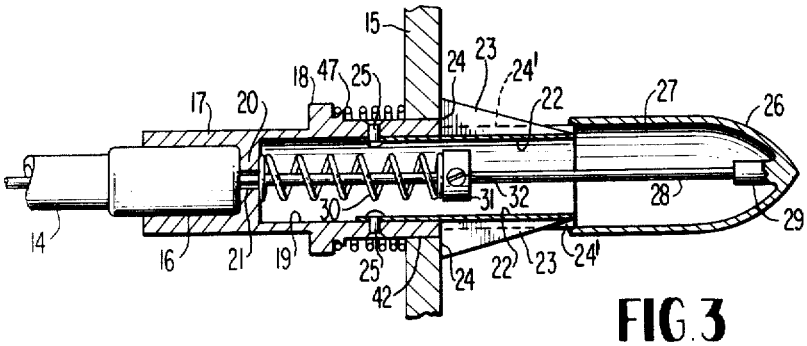
FIG. 3

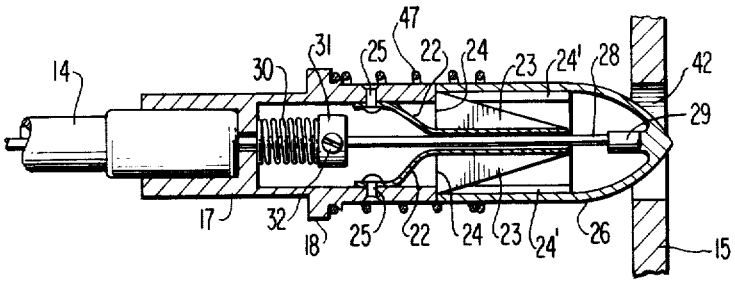
FIG. 4
FIG. 5
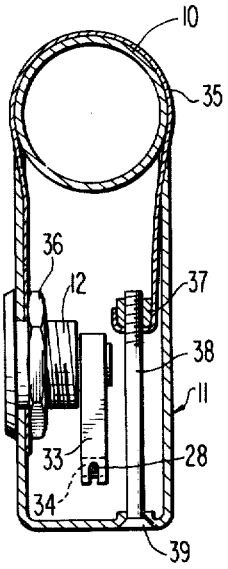
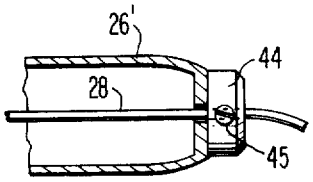
FIG. 7
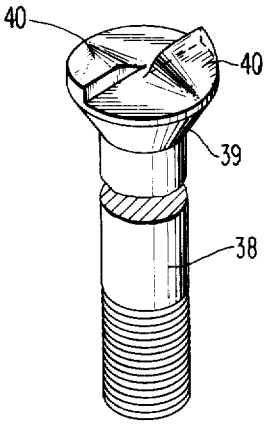
FIG. 6
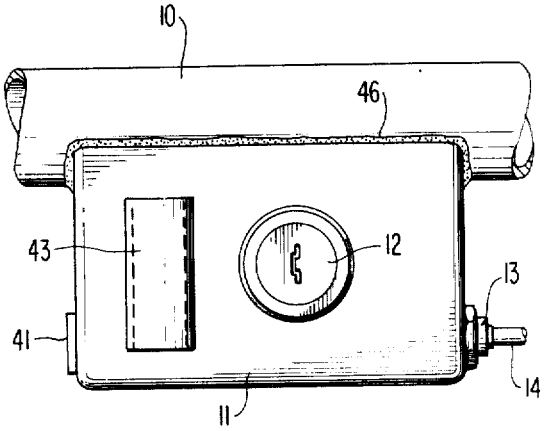
FIG. 8

LOCKING MEANS FOR BICYCLES AND THE LIKE

Matter enclosed in heavy brackets [ ] appears in the original patent but forms no part of this reissue specification; matter printed in italics indicates the additions made by reissue.

BACKGROUND OF THE INVENTION

As a by-product of the current energy shortage and as a part of the continuing effort by the Government and private industry to control air pollution, the use of bicycles for daily transportation as well as for pleasure and exercise has increased and is continuing to increase dramatically on a world-wide basis. Cities and municipalities strongly encourage the use of bicycles, where possible, instead of the automobile for the already stated reasons and, additionally, to reduce the traffic and parking problems particularly in downtown areas.

As a result of such widespread increase in bicycle sales and usage, the problem of theft has correspondingly increased particularly in terms of the most popular lightweight multi-speed bicycles which range in cost from slightly above $100 to several hundred dollars.

A variety of locking devices for bicycles are available on the market and have been proposed in the prior patented art. These range from simple padlocks which may engage through the wheel spokes to lock the wheel against rotation to various chain and cable locks used with accompanying key locking mechanisms or combination locks. One example of the patented prior art is shown in U.S. Pat. No. 1,991,825.

A good many of the available bicycle locking devices are unduly expensive and tend to be awkward and time-consuming to operate. The conventional padlock and chain requires up to 30 or 45 seconds to use for locking or unlocking the bicycle and also requires a two-hand operation with the rider dismounted. This can be quite inconvenient in cases where the weather is inclement. One of the chief features and advantages of the present invention is a substantial reduction in the time required to utilize the locking means, along with a simplified mechanical arrangement which reduces the procedure of locking or unlocking to a simple single-hand manipulation. The total operating time can be reduced to as little as 2 to 5 seconds to either lock or unlock the bicycle.

Another annoying problem mitigating against the use of bicycles is the problem of finding a convenient and secure anchoring means or fixed object to which the bicycle may be locked. Special bicycle locking racks are sometimes provided at schools or playgrounds but are not generally available on city streets or sidewalks. Furthermore, these specialized racks are very costly and take up substantial space. In this connection, one of the chief features of the invention and one of its objectives is to greatly expand the number of places where a bicycle can be securely anchored. To utilize the invention in the most convenient and efficient manner, all that is required is a sturdy hollow post provided with a locking opening of the proper size to receive a simple plug-in latch terminal on the end of the flexible tether forming the principal element of the invention. Every existing parking meter post in most cities is ideally suitble to serve as the necessary anchor member for the locking means of this invention. By simply drilling a small hole, such as a ⅝ inch diameter hole in one side of any sturdy tubular post, the same is immediately adapted to cooperate with the invention in forming a secure and highly convenient locking means for bicycles. Several such holes drilled in a single post will allow a like number of bicycles to be locked to one post, although as a practical matter, one or two blind type locking openings per post is preferable for the convenience standpoint. Cities and universities could easily initiate a program of drilling one or two holes in all existing and newly installed tubular posts or, alternately, the authorities could allow individual bicycle users to drill their own holes in suitable posts. While existing types of bicycle locks lack the capability of the invention for plugging into a simple blind hole, the invention retains the capability of conventional chain and cable locks to be looped around posts or other fixed objects found to be available.

Additionally, the tether element of the invention can also be passed through the bicycle wheel in a conventional manner and a convenient socket is provided on the assembly for holding and storing the plug-in terminal while the latter is idle.

Another unique feature of the invention resides in the manner in which it is attached very securely to the bicycle frame so as to defeat removal or tampering by a thief.

Still another important feature of the invention resides in an internal key lock controlled latch element retracting means which greatly facilitates the rapid and convenient unlocking of the bicycle and renders the mechanism additionally tamper-proof, as well as highly compact and clean in appearance or design. The use of high strength flexible sheathing or conduit of various known types renders the invention not only practical but relatively economical to manufacture. The use of corrosion-resistant metal solves the problem of exposure to the weather.

Other features and advantages of the invention will become apparent during the course of the following description.

BRIEF DESCRIPTION OF DRAWING FIGURES

FIG. 1 is a side elevation of a bicycle equipped with the locking means of the invention and illustrating the most favored way of utilizing the invention in connection with a hollow post having a blind locking opening therein.

FIG. 2 is an enlarged fragmentary side elevation, partly in section and partly broken away, showing the locking means in relation to an adjacent anchoring post.

FIG. 3 is a further enlarged fragmentary vertical section through the latching mechanism and retracting means at the plug-in terminal of the flexible tether.

FIG. 4 is an additional section similar to FIG. 3 illustrating the operation of retracting the spring-loaded latch elements during the unlocking procedure.

FIG. 5 is a vertical section taken on line 5—5 of FIG. 2.

FIG. 6 is a perspective view of an anti-theft screw employed in the invention.

FIG. 7 is a fragmentary cross sectional view showing a modification of the plug-in terminal with adjusting means for the latch retracting wire.

FIG. 8 is a fragmentary side elevation showing a modification of the key lock casing and its attachment to the cycle frame.

DETAILED DESCRIPTION

Referring to the drawings in detail wherein like numerals designate like parts, the numeral 10 designates a bicycle frame bar forming a convenient mounting support for a casing 11 in which a conventional key-operated locking unit 12 is mounted and enclosed as shown in FIGS. 2 and 5. The housing 11 is equipped near its bottom and on one side with a secure screw-threaded fitting 13 serving to anchor one end of a flexible tubular cable 14, conduit or sheath, to the housing 11. The hollow flexible element 14 forms a tether for locking the bicycle securely to a steel post 15 or other convenient stationary object and the tether is therefore formed of high strength material. Flexible sheathings or guide tubes for certain control cables, tachometer shafts, and the like are suitable to form the tether 14.

The tether 14 is formed in a convenient length to carry and store on the bicycle without inconvenience but is sufficiently long to be looped around posts or other fixed members or to be passed between wheel spokes on the bicycle.

At its forward end, the flexible element 14 is firmly anchored in a socket opening 16 of a rigid sleeve 17 having an external shoulder 18 for a purpose to be described and also having a forward bore 19 and a cross web 20 at the rear end of this bore, said cross web having a small central opening 21. Permanently attached to the sleeve 17 within its bore 19 is a pair of latch activating springs 22 which extend to the forward end of the sleeve 17. On their forward end portions, the springs 22 carry a pair of forwardly tapering radially projecting latch elements or plates 23 having rear square shoulders 24. The latch elements 23 project movably through slots 24', FIG. 4, formed in the sleeve 17 at diametrically opposite locations thereon, said slots continuing to the forward end of the sleeve. The springs 22 may be anchored to the sleeve 17 by rivets 25, or equivalent means. FIG. 3 shows the latch elements 23 in their expanded active positions under the biasing force of the springs 22. At this time, the latch elements project radially beyond the sleeve 17 on opposite sides thereof with the shoulders 24 perpendicular to the sleeve axis. FIG. 4 depicts the latch elements 23 in retracted non-locking positions to which they are shifted by means now to be described. In such positions, the springs 22 yield, as shown, to allow the square shoulders 24 to pass inwardly of the periphery of the sleeve 17.

The retraction means for the normally active spring-loaded latch elements 23 comprises a hollow bullet-like cylindrical cover and camming member 26 which is forwardly tapered and has a rear cylindrical bore 27 of sufficient size to telescope over the forward part of sleeve 17 adjacent to the slots 24' in which latch elements 23 operate. As shown in FIG. 4, when the cover 26 is drawn rearwardly relative to the sleeve 17 and latch elements by the movement of an internal centrally located axial wire 28, the latch elements 23 will be cammed by the rear end of the cover 26 to their retracted positions inside of the sleeve 17 and cover 26. The forward end of wire 28 is firmly attached to the element 26 as at 29.

The wire 28 which like the sheathing 14 is flexible is biased forwardly with the cover 26 to a position clear of the latch elements, FIG. 3, by an expansible coil spring 30 surrounding the wire and having its rear end seating on the cross web 20 and its forward end engaging a collar 31 secured to the wire 28 by a set screw 32. The wire 28 continues rearwardly through the hollow sheath or tether 14 and through the fitting 13 to the interior of lock casing 11. Inside of this casing, a rotary arm or crank 33 operated by the key lock mechanism 12 with a suitable key from the exterior of the casing is operatively connected at 34 with the wire 28 so that the latter can be retracted through the sheath 14 against the force of spring 30 to retract latch elements 23 and unlock the bicycle. When the arm 33 is released by removal of the key from the lock, the spring 30 will automatically return the wire 28 and cover 26 to their forward positions relative to the sheath 14 and sleeve 17, allowing the latch elements 23 to again expand outwardly.

The lock casing 11 may be firmly secured to the bottom of bicycle frame member 10 by a metal strap 35 having one end portion apertured to receive the lock 12 inside of casing 11 while being clamped to one side wall of the casing by a nut 36, see FIG. 5. The other end of metal strap 36 is anchored inside of the casing 11 by a lock nut 37 to a screw 28 whose head 39 is countersunk into the lower wall of the casing 11. Additionally, to defeat removal of the screw 38 by a thief, as depicted in FIG. 6, the screw 18 is of a type having clutching jaws 40 which can be operated by a standard screwdriver to turn the screw in one direction only, namely, in the direction which will tighten the screw. The screw 38 cannot be loosened readily because the screwdriver blade, when turned in the reverse direction, will skid over the tapered clutch jaws 40.

The lock casing 11 is equipped preferably on its rear side away from the fitting 13 with a latch receiver or socket 41 into which the forward latching end or terminal of the tether may be locked in the same manner that it is locked to an anchoring post 15. When the post 15 is employed, it is provided with an opening 42 of the proper diameter to receive therethrough the element 26 and the forward portion of sleeve 17 whose movement into the post will be limited by the enlarged shoulder 18. When the tapered spring-loaded latch elements 23 encounter the opening 42, they will yield inwardly and slide through the opening and then expand outwardly with their shoulders 24 in locked engagement with the bore of the hollow post and unable to pass outwardly through the opening 42 until retracted by operation of the key lock 12 and associated components. By virtue of this arrangement, the cyclist is enabled to approach the post 15 and by a simple one-hand operation plug the flexible tether into locking engagement with the post by utilizing the opening 42 thereof. To release the bicycle from the post, the operation is equally simple, and it is merely necessary to place a key in the lock 12 and turn the key to move the arm 33 and retract wire 28 and associated parts to retract or release the latch elements 23. The locking and unlocking procedures require only a few seconds time to perform and are much simpler than conventional procedures. It is noted that, when the apertured post 15 is available, there is no necessity for looping the tether 14 around the post and instead of this customary procedure, the leading end of the tether is merely plugged in, as described. The tapered bullet-like element 26 also serves to guide the device into the opening 42 and this is a convenient feature particularly at night.

When the apertured post 15 is not available, the invention may be used like most conventional cable or chain locks, and the tether 14 is looped around a solid post or other suitable anchor member and then plugged into the socket 41, FIG. 2, in precisely the same manner that it is plugged into the post opening 42 when the latter is available. The retractable latches 23 and associated parts function in relation to the socket 41 in the identical manner described for these same parts in relation to the apertured post 15.

When the locking device of the invention is idle and merely being carried on the bicycle, the locking terminal including elements 17, 23 and 26 may be introduced into a short vertical tube section 43 secured rigidly to one side of casing 11. The element 26 is introduced downwardly into tube section 43, as illustrated in FIG. 1, and when the spring-loaded latch elements 23 enter the tube section, they will be forced inwardly enough to create friction sufficient to hold the tether in the tube section without having it bounce out accidentally. Again, downward movement will be limited by engagement of the shoulder 18 with the top of tube section 43. The tube section or holder 43 in no way interferes with the removal of the tether when it is desired to plug the device into the post 15 or into the socket 41. The versatility of the invention and its simplified and expeditiously mode of use should now be fully apparent to anyone skilled in the art without further explanation. The device possesses many advantages over prior art devices and some of the major advantages have been enumerated while others are apparent after an understanding of the structure and its operation.

FIG. 7 shows a slight modification of the invention wherein the tip element or cover 26' has the wire 28 attached adjustably thereto by means of a leading end collar 44 and clamping set screw 45. This provides further adjustment for removing slack from the wire and provides a detachable connection between the wire and the element 26', rather than a permanent connection.

FIG. 8 shows another slight modification wherein the attachment strap 35 and associated parts are eliminated and the casing 11 is secured directly by welding at 46 to the bicycle frame bar 10.

As an optional feature of the invention rendering the unlocking procedure even more simplified, an external coil spring 47 may be mounted upon the leading end portion of rigid sleeve 17 ahead of shoulder 18 and suitably attached to the latter. This exterior spring, when relaxed, FIG. 4, will extend somewhat beyond the sleeve 17 and will be positioned to engage the post 15, FIG. 3, when the tether is engaged lockingly through the post opening 42. The compressed spring 47 will have energy stored therein for the purpose of causing the plug-in latch means to spring automatically away from the opening 42 and the post when the key-operated crank 33 is turned to the release or unlocked position against the force of spring 30 which normally biases the lock crank to the locking position. Therefore, when the optional spring 47 is used, the tether does not have to be retracted from the opening 42 by hand when the key lock means is turned to the unlocked position. The spring 30, on the other hand, assures that the plug-in latch means is always held [is] *in* a ready position for entry into the opening 42 or the equivalent socket 41. The device will operate entirely satisfactorily with or without the external spring 47.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An anti-theft locking means for bicycles or other portable articles comprising a flexible tether attached to the bicycle and adapted to be extended therefrom, a plug-in latch means on the leading end of the tether adapted to be received by an aperture in a wall of an anchoring member to releasably secure the bicycle to such member, and a key activated means on the bicycle connected with said plug-in latch means of the tether and operable to deactivate the plug-in latch means whereby the same can be removed from said aperture, said tether comprising a hollow flexible tether, said plug-in latch means including spring urged latch elements which normally project radially of the tether to interlock with said aperture, and said key activated means including a flexible control element extending through the hollow flexible tether and being movable axially relative thereto and having a connection with said spring urged latch elements to retract such elements when said flexible control element is moved in one direction.

2. An anti-theft locking means according to claim 1, wherein said connection comprises a cup-like camming element for said latch elements on the leading end of said control element.

3. An anti-theft locking means according to claim 2, and a rigid sleeve on the leading end of the hollow flexible tether and having slots in its side wall, leaf springs attached to said sleeve, forwardly tapering latch elements carried by the leaf springs and projecting through said slots of the sleeve, said control element comprising a wire and said wire extending through said sleeve, and said cup-like camming element attached to the leading end of said wire and being rearwardly open and adapted to telescope rearwardly over the leading end of said sleeve to engage said latch elements and collapse them inwardly against the forces exerted by said springs.

4. An anti-theft locking means according to claim 3, and an additional spring means connected with said wire and urging said wire forwardly with said cup-like camming element so that the latter is normally held out of engagement with said latch elements.

5. An anti-theft locking means according to claim 1, and means forming a locking socket on the bicycle adapted to receive said plug-in latch means of the tether when the tether is looped around a stationary anchoring member.

6. An anti-theft locking means for bicycles comprising a key lock unit adapted for secure attachment to a bicycle frame member, a flexible tubular tether attached to the key lock unit and adapted to be extended therefrom for locking engagement with an apertured post or the like, retractable spring-urged latch means on the leading end of the tether insertable through a post aperture into locking engagement with a post wall, and a flexible control element for the retractable latch means having a connection therewith and extending through said tubular tether and being movable relative thereto and connected with a movable member on the key lock unit whose movement is controlled by a key.

7. An anti-theft locking means according to claim 6, and means forming a plug-in locking socket for said latch means on said key lock unit whereby the anti-theft locking means may be utilized in two separate modes of operation.

8. An anti-theft locking means according to claim 6, and a first spring connected with the flexible control element and urging it with said movable member on the key lock unit to an active locking position, and a second spring on the exterior of the tether and engaging a post or the like when said latch means is inserted through said aperture and storing energy for the subsequent automatic removal of the latch means from the aperture when said movable member is moved by a key against the force of the first spring to a latch release position.

9. An anti-theft locking means according to claim 6, and reslient means connected with said control element and biasing it to a latch active position with said movable member on the key lock unit.

10. An anti-theft locking means for bicycles or the like comprising a flexible tether attached to the bicycle and adapted to be extended therefrom, a plug-in latch means on the leading end of the tether adapted to be received by an aperture in a wall of an anchoring member to releasably secure the tether to the anchoring member, a key activated means on the bicycle connected with said plug-in latch means of the tether and operable to deactivate the latch means so that it can be removed from said aperture, and means forming a locking socket on the bicycle adapted to receive the plug-in latch means of the tether when the tether is looped around a stationary anchoring member, said lastnamed means comprising a lock casing attached to a frame member of the bicycle and having a socket element for the reception of the plug-in latch means and having a key lock mechanism on said casing including a movable element connected with the plug-in latch means, and said plug-in latch means including a pair of spring loaded normally extended retractable latch elements, and said movable element being connected with said latch elements to retract them when the movable element is shifted in one direction by said key activated means.

*11. A locking means for a bicycle of the like comprising a locking unit having a receiver, means for permanently securing said locking unit to a bicycle frame member, a flexible tether having one end permanently secured to said locking unit and having a plug-in lock element to its free end and adapted to lockingly engage in said receiver, said plug-in lock element having normally extended retractable latch elements thereon, and key operable release means on said locking unit and being connected with said latch elements and operable to retract the latch elements so as to release the plug-in lock element from locked engagement with the receiver.*

*12. A locking means for a bicycle or the like as defined in claim 11, and said key operable release means on the locking unit including a movable element connected with said latch elements and being shiftable in a direction to retract the latch elements, and spring means biasing the latch elements toward their normal extended locking positions.*

* * * * *